(12) United States Patent
Yu

(10) Patent No.: US 11,671,356 B2
(45) Date of Patent: *Jun. 6, 2023

(54) USER-PLANE PATH SELECTION FOR THE EDGE SERVICE

(71) Applicant: Apple Inc., Cupertino, CA (US)

(72) Inventor: Yifan Yu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,126

(22) Filed: Sep. 22, 2021

(65) Prior Publication Data

US 2022/0021607 A1    Jan. 20, 2022

Related U.S. Application Data

(63) Continuation of application No. 16/809,329, filed on Mar. 4, 2020, now Pat. No. 11,178,048, which is a
(Continued)

(51) Int. Cl.
*H04L 45/00* (2022.01)
*H04W 40/02* (2009.01)
*H04L 67/1036* (2022.01)
*H04L 65/1033* (2022.01)
*H04L 69/22* (2022.01)
*H04L 67/1038* (2022.01)
(Continued)

(52) U.S. Cl.
CPC .......... *H04L 45/38* (2013.01); *H04L 61/4511* (2022.05); *H04L 65/1036* (2013.01); *H04L 67/1036* (2013.01); *H04L 67/1038* (2013.01); *H04L 69/22* (2013.01); *H04W 40/02* (2013.01); *H04W 76/00* (2013.01)

(58) Field of Classification Search
None
See application file for complete search history.

(56) References Cited

U.S. PATENT DOCUMENTS

2012/0220330 A1    8/2012    Goldner et al.
2013/0242728 A1    9/2013    Chaudhuri et al.
(Continued)

OTHER PUBLICATIONS

"International Application Serial No. PCT US2016 049418, International Preliminary Report on Patentability dated Oct. 18, 2018", 10 pgs.

(Continued)

*Primary Examiner* — Christine T Duong
(74) *Attorney, Agent, or Firm* — Kowert, Hood, Munyon, Rankin & Goetzel, P.C.

(57) ABSTRACT

Techniques for a selection or reselection a user-plane path in a mobile network are disclosed herein. A user-plane gateway (GW-U) can be configured to decode a packet received from a control plane gateway (GW-C) in a packet data network gateway (PGW) to determine a forwarding policy. Additionally, the GW-U can decode, from an evolved node B (eNB), an internet protocol (IP) packet having a header field. Furthermore, the GW-U can determine a user-plane path for the IP packet based on a comparison of the header field and the forwarding policy. Based on the determined user-plane path, the GW-U can forward the IP packet to a local application server (AS), encapsulate and forward the IP packet to the PGW, or discard the IP packet. Moreover, the GW-U can encode the IP packet for transmission based on the determined user-plane selection.

20 Claims, 6 Drawing Sheets

Related U.S. Application Data continuation of application No. 16/084,674, filed as application No. PCT/US2016/049418 on Aug. 30, 2016, now Pat. No. 10,587,503, which is a continuation of application No. PCT/CN2016/078780, filed on Apr. 8, 2016.

(51) Int. Cl.
*H04W 76/00* (2018.01)
*H04L 61/4511* (2022.01)

(56) References Cited

U.S. PATENT DOCUMENTS

| | | |
|---|---|---|
| 2014/0136675 A1 | 5/2014 | Yao et al. |
| 2014/0161026 A1 | 6/2014 | Stojanovski et al. |
| 2016/0006606 A1 | 1/2016 | Zhu et al. |
| 2016/0080260 A1 | 3/2016 | Wang et al. |
| 2017/0064751 A1 | 3/2017 | Sjodin et al. |

OTHER PUBLICATIONS

"International Application Serial No. PCT/US2016/049418, International Search Report dated Apr. 26, 2017", 3 pqs.
"International Application Serial No. PCT/US2016/049418, Written Opinion dated Apr. 26, 2017", 8 pgs.
James, Kempf, et al., "Moving the mobile Evolved Packet Core to the cloud", IEEE 8th! International Conference on Nireless and Mobile Computing, Networking and Communications, (Oct. 8-10, 2012), 784-791.

USER-PLANE PATH SELECTION FOR THE EDGE SERVICE

PRIORITY CLAIM

This application is a continuation of and claims priority to U.S. patent application Ser. No. 16/809,329, filed Mar. 4, 2020, which is a continuation of and claims priority to U.S. patent application Ser. No. 16/084,674, filed Sep. 13, 2018, now U.S. Pat. No. 10,587,503, issued Mar. 10, 2020, which is a U.S. National Stage Filing under 371 from International Application No. PCT/US2016/049418, filed Aug. 30, 2016, and published in English as WO2017/176307 on Oct. 12, 2017 which is a continuation of and claims priority under U.S.C. 120 to International Application No. PCT/CN2016/078780, filed Apr. 8, 2016, each of which is incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pet who to wireless communications. Some embodiments relate to wireless networks including 3GPP (Third Generation Partnership Project) networks, 3GPP LTE (Long Term Evolution) networks, 3GPP LTE-A (LTE Advanced) networks, and fifth generation (5G) networks, although the scope of the embodiments is not limited in this respect.

BACKGROUND

The selection or reselection ((re)selection) of an efficient user-plane paths can be difficult and complicated. In some instances, the reselection of the user-plane path between a user equipment (UE) and a service hosting entity residing close to the edge may not be feasible, when the previous path become inefficient. For example, the UE may have to establish the user-plane path with the edge service hosting as long as the user-plane path is available because oi the low latency involved with the reselection process. Accordingly, the (re)selection process encounters the challenges with signaling overhead, the path switching latency, and a burden of third party service provider.

DETAILED DESCRIPTION

The following detailed description refers to the accompanying drawings. The same reference numbers may be used in different drawings to identify the same or similar elements In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Figure 1:
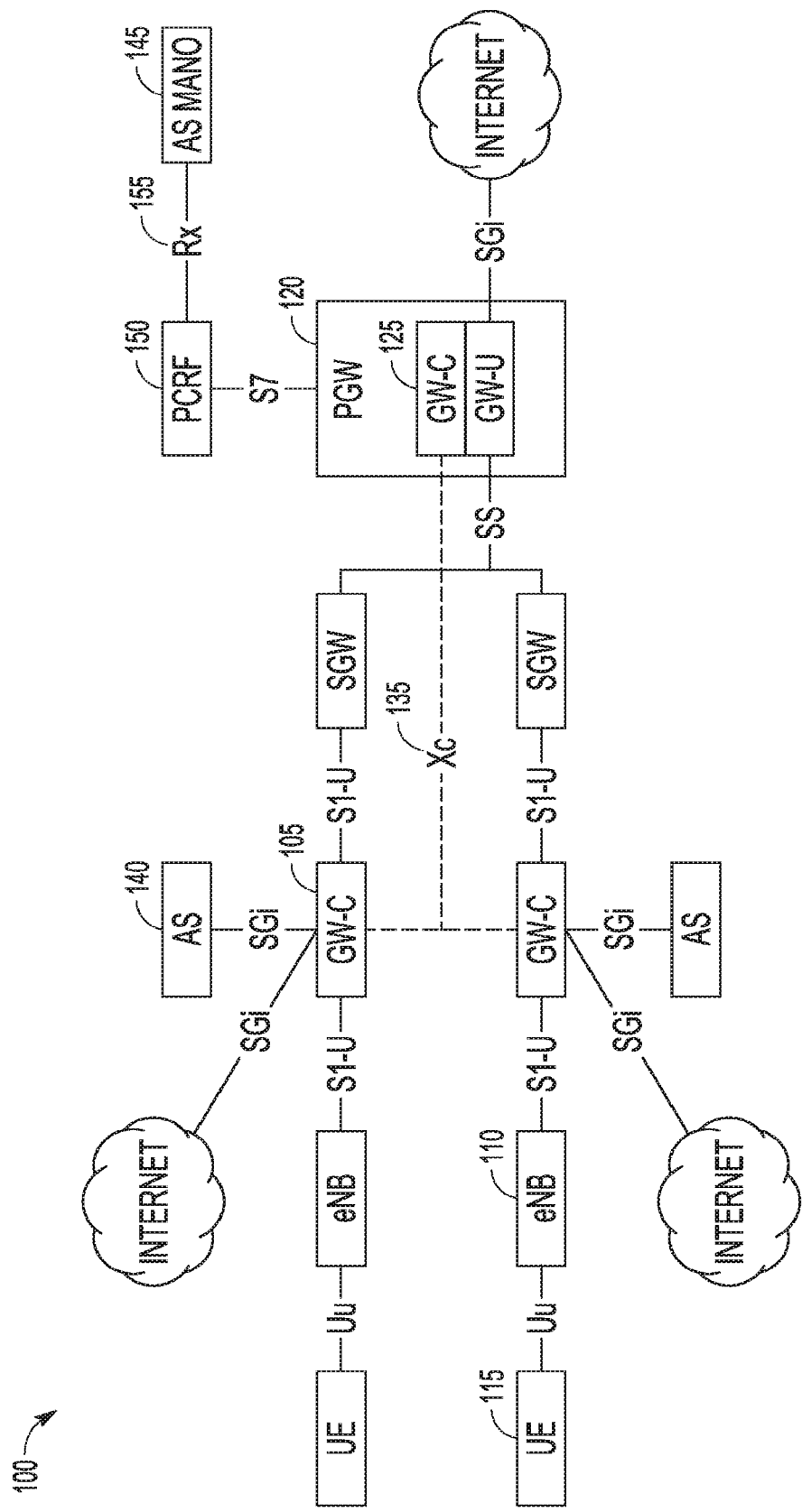
FIG. 1 illustrates a system architecture of a mobile network, in accordance with some embodiments.

FIG. 1 illustrates a system architecture of a mobile network, in accordance with some embodiments.

According to some embodiments of the present invention, techniques are described for the (re)selection of efficient user plane paths. In current implementations, there has been issues with the reselection of user-plane path between a UE and a service hosting entity residing close to the edge (including the radio access network) when the previous path becomes inefficient. For example, the UE may establish the user-plane path with the edge service hosting as long as it is available because the low latency is enabled with such selection in current implementations, a local IP access (LIPA) or selected IP traffic offload (SIPTO) tries to resolve the (re)selection issues, but current implementations encounters the challenges in the signaling overhead, the path switching latency and a burden on the third party service provider.

In contrast, according to some embodiments, the (re)selection process reduces signaling overhead. The user-plane path (re)selection is performed with policy updates only triggered upon a change in the edge service deployment. As a result, it is estimated that the amount of signaling messages using the embodiments described herein is reduced by 30% in comparison with the LIPA or SIPTO (LIPA/SIPTO) implementations.

In some instances, the (re)selection latency is reduced in comparison with the LIPA/SIPTO implementations. Unlike the LIPA/SIPTO implementations, the traffic offloaded to the local network docs not have need interaction between the evolved Node-B (eNB) and the evolved packet core (EPC) entities, such as the serving gateway (SGW) and the mobility management entity (MME).

Furthermore, the (re)selection techniques described herein can reduce the burden on the third party service provider. For example, unlike the techniques described herein, the LIPA/SIPTO implementations asked for architectural update in the platform of the third party service provider, which increased implementation cost.

The Traffic Offload Function (TOF) is extended as the distributed user-plane (U-plane) gateway (GW) (GW-U) 105 coupled with the evolved nodeB (eNB or eNodeB) 110 and transparent to the user equipment (UE) 115. It allows the connection to the Internet through the network address translation (NAT) functionality.

The controller or control circuitry in the controller-plane (C-plane) of the Packet Data Network Gateway (PGW) 120 (GW-C) 125 may configure the U-plane path selection policy defined as the flow table in the GW-U 130 through the Xc interface 135. The user-plane traffic from and to the UE 115 passes through distributed GW-U 105 where the (General Packet Radio Service) GPRS tunneling protocol (GTP) decapsulation and encapsulation is conducted for the selection or reselection ((re)selection) policy checking. The distributed GW-U 105 forwards the user-plane traffic to GW-U 130 in the PGW 120 in default given the absence of the matched (re)selection policy. In some embodiments, the distributed GW-U 105 is to act as the transparent domain name system (DNS) proxy to the UE 115.

The application server (AS) 140 acts as the service providing entity residing close to the network edge. The AS Management and Orchestration (MANO) 145 entity is in charge of the service deployment in the AS 140. The third party service provider may rely on the AS MANO 145 to deploy its service in the specific AS 140 adjacent to the network edge. The AS MANO 145 is able to have the policy and changing rules function (PCRF) 150 configure the (re)selection policy in the distributed GW-U 105 for the traffic offloading to the AS 140 with the edge service through the reception (Rx) interface 155.

Figure 2:
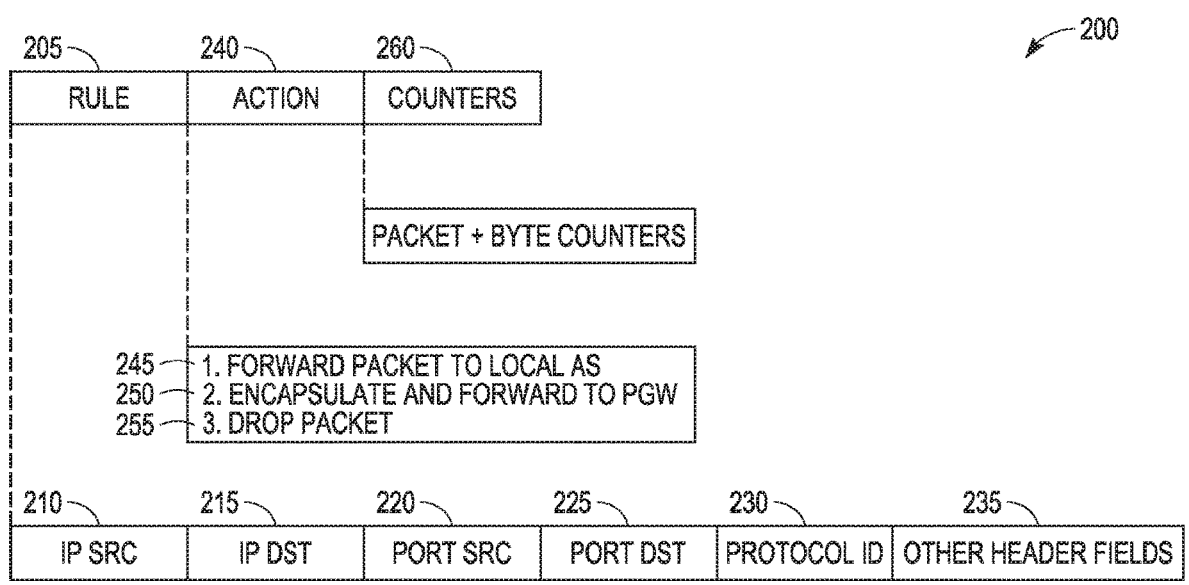
FIG. 2 illustrates an example selection and reselection rule definition, in accordance with some embodiments.

In accordance with various embodiments, the (re)selection policy may be defined according to the flow table 200 as illustrated in FIG. 2. It should be noted that the (re) selection policy may be referred to as a "policy," a "selection policy," a "(re)selection policy," a "forwarding policy," a "routing policy," and the like. The rule section 205 indicates the header field of the packet delivered in the user-plane which can be used as the matching metric for packet forwarding. The five tuples in the internet protocol (IP) header are currently used for the offloading policy matching. The five tuples include an IP source address 210, an IP destination address 215, a port source address 220, a port destination address 225, and a protocol identity 230.

According to some embodiments, the rule sets can be extended by introducing other header fields 245. For instance, the tunnel endpoint identifier (TEID) in the GTP header can be used as the matching rule as well. In some instances, the packer is matches the specific rule only when its header matches all the fields.

For example, given a rule that the User Datagram Protocol (UDP) packet with the destination port of 53 are to be offloaded, the distributed GW-U 105 can act as the transparent DNS proxy to the UE 115 because all the DNS requests would be for warded to it.

The action 240 shows How the GW-U 105 handles the packet with the matching field Baaed on a first action 245, the packet is forwarded to a local AS 140, which refer that the user-plane path is switched to the local network Based on a second action 250, the packet is encapsulated and forwarded to PGW 120, which indicates that the user-plane path is through the Evolved Packet Core (EPC). Based on a third action 255, the packet is dropped, which means that the packet can be discarded.

Additionally, the counter 260 is used to calculate the payload of the packet matching the rule 205. The counter 260 can enable the offline charging without the PGW 120.

Figure 3:
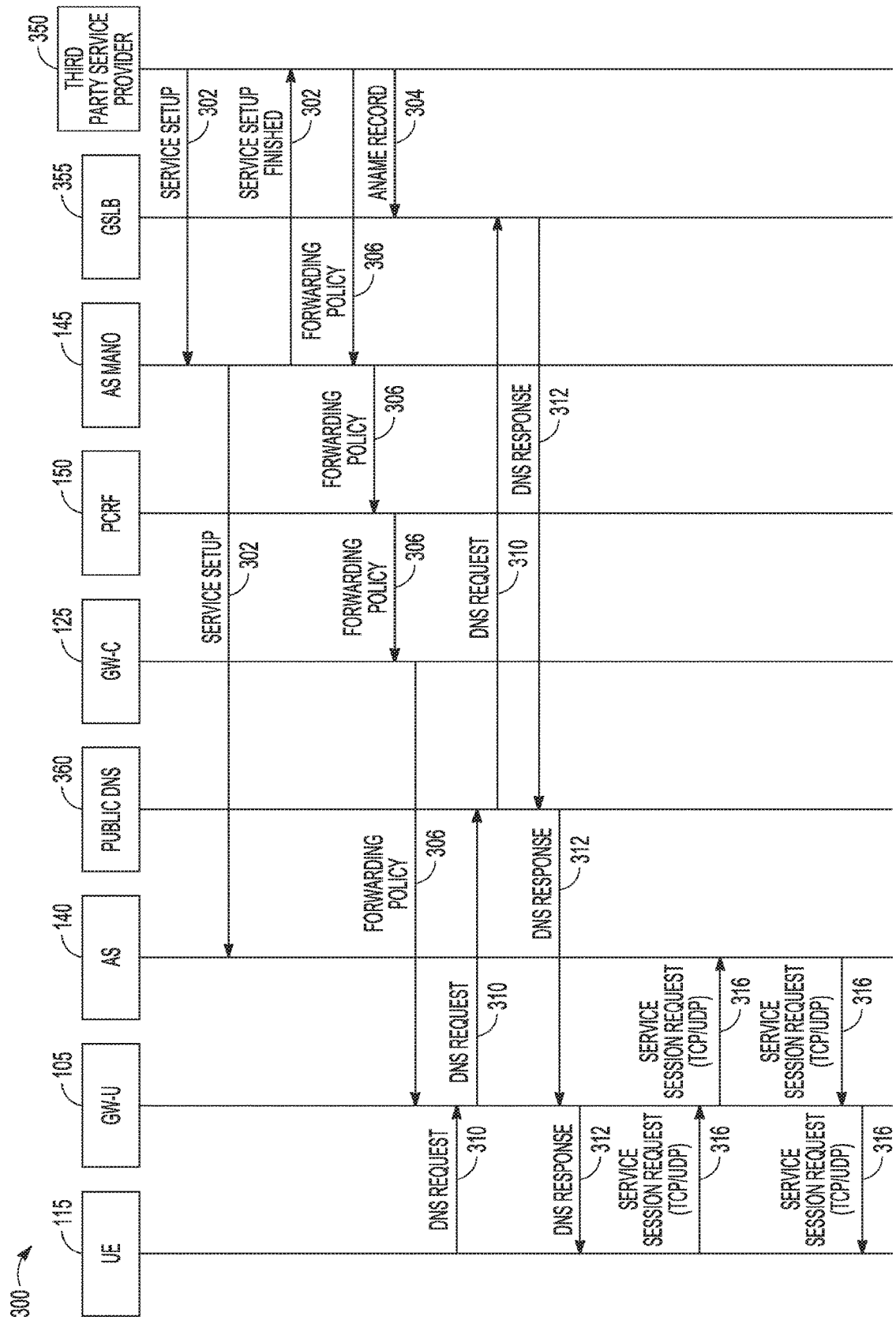
FIG. 3 illustrates an example communication 300 for a user-plane path (re)selection, according to some embodiments.

FIG. 3 illustrates an example communication 300 for a user-plane path (re)selection, according to some embodiments. The (re)selection can be enabled with the involvement of both an operator's network element and a third party service provider's infrastructure.

At operation 302, a third party service provider 350 uses the AS MANO 145 entity to setup its service at the AS 140. Then, at operation 304, the third party service provider has its own Global Server Load Balancing (GSLB) system 355 that creates an Address Name (ANAME) record associating the IP address of the AS 140 where the service is deployed with the distributed GW-U 105 connecting the AS 140. Meanwhile, at operation 306, the AS MANO 145 notifies the GW-C 125 in the PGW 120 to configure the forwarding policy in the distributed GW-U 105 so that the IP packets destined to the AS 140 can be offloaded to the local network.

Additionally, at operation 308, the UE 115 initiates the service request with the sending of the DNS request which is forwarded to the distributed GW-U 105. Then, if there is no cached record in the GW-U 105, at operation 310, the DNS request is delivered to the GSLB system 355 owned by the third party service provider 350 by following the Canonical Name (CNAME) record in the Public DNS 360 maintained by the operator. CNAME records may be used to associate one name or service to another name or another service. At operation 312, the DNS response front the GSLB system 355 to the GW-U 105 notifies that the IP address of the AS 140 should be the target for the service delivery. After the reception of the DNS response, the GW-U 105 forwards it to the UE 115 at operation 314.

Furthermore, with the IP address of the AS 140, the UE 115 attempts to establish the connection with the AS 140, at operation 316. In addition, the returned DNS response, at operation 312, is cached in the GW-U 105 for the potential request in the future.

Subsequently, after the service session has been initiated, the IP packets, with the destination address to the AS 140, are transmitted to the AS 140 from the UE 115. Then the distributed GW-U 105 forwards the packets to the AS 140 in the local network by following the forwarding policy configured by the GW-C 125 in the PGW 120.

Figure 4:
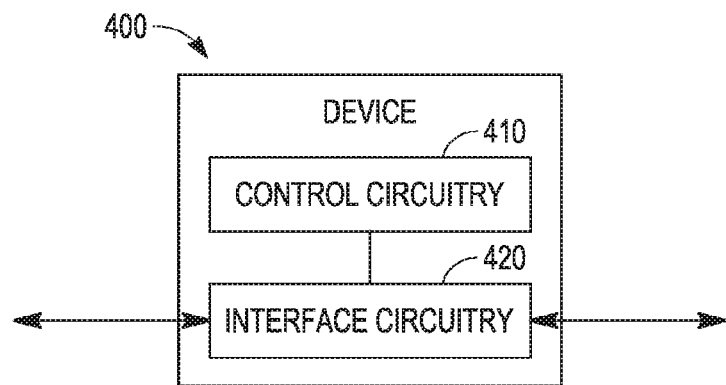
FIG. 4 illustrates an electronic device, in accordance with some embodiments.

FIG. 4 illustrates a device 400 in accordance with some embodiments. Device 400 may include control circuitry 410 coupled with the interface circuitry 420.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The interface circuitry 410 may be configured to communicate with other network entities over various interfaces using appropriate networking communication protocols. The interface circuitry 410 may be capable of communicating over any number of wired or wireless communication interfaces. In some embodiments, the interface circuitry 410 may communicate over Ethernet or other computer networking technologies using a variety of physical media interfaces such as, but not limited to, coaxial, twisted-pair compare, and fiber-optic media interfaces.

The control circuitry 420 may be configured to provide higher-layer operations that include generating and processing signals transmitted and received by the interface circuitry 410.

In some embodiments, the device 400 may be a UE (e.g., UE 115), an eNB (e.g., eNB 115), a gateway (e.g., GW-C 125, GW-U 105), a mobility management entity (MME), a home subscriber server (HSS), a serving gateway (SGW), a PGW (e.g., PGW 120), an AS (e.g., AS 140), a PCRF (e.g., PCRF 150), in AS MANO (AS MANO 145), or any other suitable network element as described herein with respect to various embodiments. The control circuitry 420 may be configured to provide the geographical identifier in the various messages transmitted by the interface circuitry as described herein. In some embodiments, the device 400 may be configured to perform one or more processes, techniques, and/or methods as described herein, or portions thereof.

In some embodiments where the device 400 is, implements, is incorporated into, or is otherwise part of a GW-U 105, the control circuitry 420 may be to control the interface circuitry 410 to communicate with the NB 110 over a first interface (e.g., S1-U interface), communicate with the GW-C 125 over a second interface (e.g., Xc interface 135), and communicate with the AS 140 over a third interface (e.g., SGi interface).

In embodiments where the device 400 is, implements, is incorporated into, or is otherwise part of an AS MANO 145, the control circuitry 420 can include instruction to instruct the PCRF 150 to configure the GW-U 105 with a forwarding or reselection policy. Additionally, the interface circuitry 410 can transmit the instruction to the PCRF 150 over an Rx interface 155.

Figure 5:
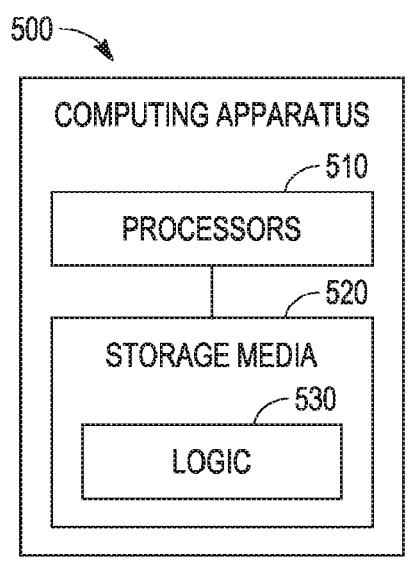
FIG. 5 illustrates another electronic device, in accordance with some embodiments.

Embodiments described herein may be implemented into a system using any suitably configured hardware and/or software FIG. 5 illustrates, for one embodiment, example components of a computing apparatus 500, which may comprise, be part of, or be implemented in be a UE (e.g., UE 115), an eNB (e.g., eNB 115), a gateway (e.g., GW-C 125, GW-U 105), a mobility management entity (MME), a home subscriber server (HSS), a serving gateway (SGW), a PGW (e.g., PGW 120), an AS (e.g., AS 140), a PCRF (e.g., PCRF 150), an AS MANO (AS MANO 145), or any other suitable electronic device.

The computing apparatus 500 may include one or more processors 510 coupled with one or more storage media 520. The processors 510 may include one or more single-core or multi-core processors. The processors may include any combination of general-purpose processors and dedicated processors including, for example, digital signal processors (DSPs), central processing units (CPUs), microprocessors, memory controllers (integrated or discrete), and so on.

The storage media 520 may be used to load and store data or instructions (collectively "logic") 530 for operations performed by the processors 510. The storage media 520 may include any combination of suitable volatile memory and non-volatile memory. The storage media 520 may include any combination of various levels of memory/storage including, but not limited to, read-only memory (ROM) having embedded software instructions (e.g., firmware), random access memory (e.g., dynamic random access memory (DRAM)), cache, buffers, and so on. The storage media may be shared among the various processors or dedicated to particular processors.

In some embodiments, one or more of the processors 510 may be combined with one or more storage media 520 and, possibly other circuitry in a single chip, a single chipset, or disposed on a same circuit board in some embodiments.

The computing apparatus 500 may perform one or more of the operations described above with respect to the control circuitry 410 or with respect to the interface circuitry 420.

In some embodiments, the computing apparatus 500 may be configured to perform one or more processes, techniques, and/or methods as described herein, or portions thereof. Some of these processes are described in the following examples. Furthermore, in some embodiments, the computing apparatus 500 may be configured to implement the control circuitry or the interface circuitry described with regard to FIG. 4.

Figure 6:
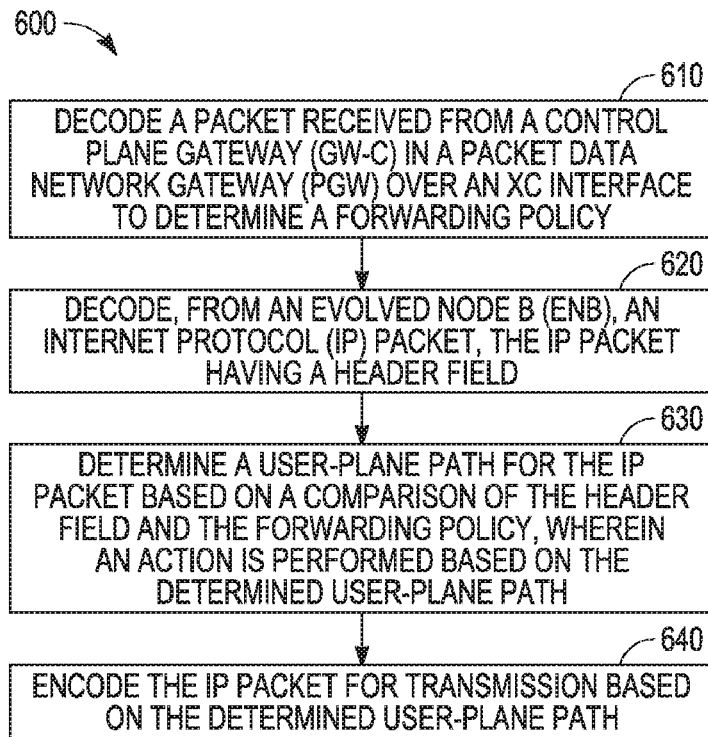
FIG. 6 illustrates an example flowchart for a (re)selection a user-plane path, in accordance with some embodiments.
Figure 7:
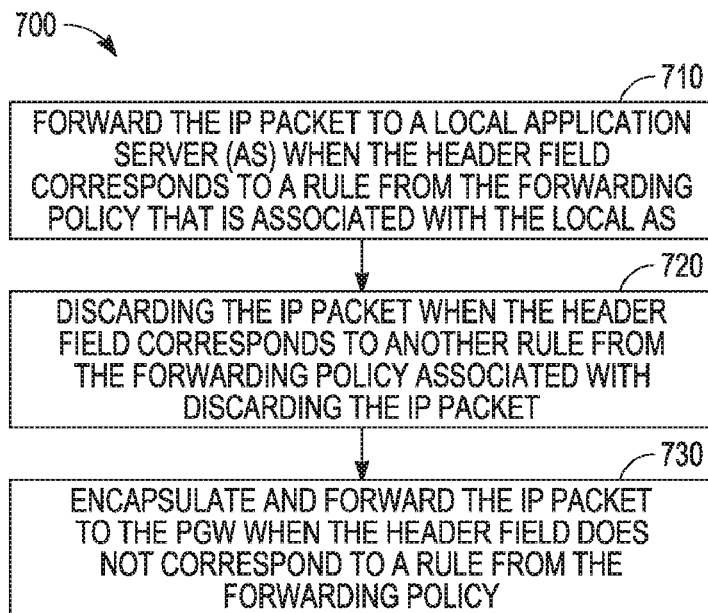
FIG. 7 illustrates an example flowchart for performing different actions based on the user-plane path determined in FIG. 6, in accordance with some embodiments.

In some embodiments, the electronic devices of FIGS. 4 and 5 may be configured to perform one or more processes, techniques, or methods as described herein, or portions thereof. FIGS. 6 and 7 describe processes that can be performed by the electronic devices of FIGS. 4 and 5.

Techniques in Selecting a User-Plane Path

FIG. 6 illustrates the operation of a method 600 for a (re)selection of a user-plane path, in accordance with some embodiments. Method 600 can be performed by the GW-U 105, the electronic device 400 and the computing apparatus 500, and so on Embodiments are not limited to these configurations, however, and some or all of the techniques and operations described herein may be applied to any systems or networks.

It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5, although it is understood that the method 600 may be practiced with any other suitable systems, interfaces, and components.

In addition, while the method 600 and other methods described herein may refer to GW-U 105, eNBs 110, or UEs 115 operating in accordance with 3GPP or other standards, embodiments of those methods are not limited to just those GW-U 105, eNBs 110 or UEs 115 and may also be practiced by the PGW 120, the serving gateway (SGW), the AS MANO 145, or other mobile devices, such as a Wi-Fi access point (AP) or user station (STA). Moreover, the method 600 and other methods described herein may be practiced by wireless devices configured to operate in other suitable types of wireless communication systems, including systems configured to operate according to various IEEE standards such as IEEE 802.11.

The method 600 can be performed by an apparatus of the GW-U 105 configured to operate for the edge service in a mobile network. The mobile network can be a fifth generation (5G) mobile network or beyond.

At operation 610 of the method 600, an apparatus of a user-plane gateway (GW-U) (e.g., GW-U 105) can be configured to decode a packet received from a control plane gateway (GW-C) in a packet data network gateway (PGW) over an Xc interface to determine a forwarding policy. For example, as previously described at operation 306 in FIG. 3, the packet contains the forwarding policy and is received from the GW-C 125 in the PGW 120. The forwarding policy can be configured by the AS MANO 145 entity. The apparatus can comprise of memory and processing circuitry. In some instances, the processing circuitry can be the control circuitry 410 of the electronic device 400 in FIG. 4 or the processors 510 of the computer apparatus 500 in FIG. 5.

At operation 620, the GW-U 105, using the processing circuitry, can decode an internet protocol (IP) packet to determine the header field contained in the IP packet. The IP packet can be received from the UE 115 via the eNB 110. For example, operation 316 in FIG. 3 illustrates the GW-U 105 receiving the IP packet. Additionally, the header field can include an IP source address, an IP destination address, a port source address, a port destination address, and a protocol identity. In some instances, the processing circuitry can be the control circuitry 410 of the electronic device 400 in FIG. 4, or the processors 510 of the computer apparatus 500 in FIG. 5.

At operation 630, the GW-U 105, using the processing circuitry, can determine a user-plane path for the IP packet based on a comparison of the header field and the forwarding policy. As previously mentioned, the header field can be received from the eNB 110 at operation 620, and the forwarding policy can be received from the GW-C 125 at operation 610. In some instances, the processing circuitry can be the control circuitry 410 of the electronic device 400 in FIG. 4, or the processors 510 of the computer apparatus 500 in FIG. 5.

Additionally, the operation 630 further includes an action being performed on the IP packet, by the GW-U 105, based on the determined user-plane path. For example, as previously described, the action 240 in FIG. 2 illustrates how the GW-U 105 handles the packet with the matching field. Method 700 in FIG. 7 further describes the different actions that can be performed by the GW-U 105 based on the determined user-plane path in some instances, the processing circuitry can be the control circuitry 410 of the electronic device 400 in FIG. 4, or the processors 510 of the computer apparatus 500 in FIG. 5.

At operation 640, the GW-U 105, using processing circuitry, can encode the IP packet transmission based on the user-plane path determined at operation 630. For example, the IP packet is forwarded to a local AS 140, the IP packet is encapsulated and forwarded to PGW 120, or the IP packet is dropped In some instances, the processing circuitry can be the control circuitry 410 of the electronic device 400 in FIG. 4, or the processors 510 of the computer apparatus 500 in FIG. 5.

Additionally, the method 600 can include an operation where the processing circuitry is further configured to increment a counter associated with tire local AS when the IP packet h forwarded to the local AS. Alternatively, the processing circuitry is configured to refrain from incrementing a counter when the IP packet is forwarded to the PGW.

In some instances, the IP packet is a domain name system (DNS) request received from UE 115. When the IP packet is a DNS request, the method 600 can include an operation where the GW-U is further configured to transmit the DNS request to GSLB system 355. The GSLB system 355 can have an address name (ANAME) record associated with an IP address of a local AS for the DNS request. Additionally, the GW-U 105 can receive a DNS response from the GSLB system 355. The DNS response having the IP address. Moreover, the GW-U 105 can transmit the DNS response to the UE. Furthermore, the memory in the GW-U 105 is further configured to store the IP address corresponding with the local AS.

FIG. 7 illustrates the operation of a method 700 for performing different actions based on the user-plane path determined in method 600, in accordance with some embodiments. Method 700 can be performed by the GW-U 105. It is important to note that embodiments of the method 700 may include additional or even fewer operations or processes in comparison to what is illustrated in FIG. 7. In addition, embodiments of the method 700 are not necessarily limited to the chronological order that is shown in FIG. 7. In describing the method 700, reference may be made to FIGS. 1-6, although it is understood that the method 700 may be practiced with any other suitable systems, interfaces, and components.

In addition, while the method 700 and other methods described herein may refer to the GW-U 105 operating in accordance with 3GPP or other standards, embodiments of those methods are not limited to just those the GW-U 105 and may also be practiced by the PGW 120, eNB 110, or other mobile devices, such as a Wi-Fi AP or STA. Moreover, the method 700, and other methods described herein, may be practiced by wireless devices configured to operate in other suitable types of wireless communication systems, including systems configured to operate according to various IEEE standards such as IEEE 802.11.

The method 700 can be performed by an apparatus of the GW-U 105 configured to operate for the edge service in a mobile network. The mobile network can be a fifth generation (5G) mobile network or beyond.

As previously discussed, the user-plane path is determined by operation 630 in FIG. 6. Based on the determined user-plane path, the GW-U 105 can perform, an action with regards to the IP packet received at operation 620 in FIG. 6. The action performed is either operation 710, operation 720, or operation 730 based oil the determined user-plane path.

At operation 710, the apparatus of the GW-U 105, using processing circuitry, can forward the IP packet to a local AS (e.g., AS 140) when the header field corresponds to a rule from the forwarding policy. The rule is associated with the local AS. As previously discussed, the forwarding policy is received at operation 610 in FIG. 6, and the IP packet is received at operation 620 in FIG. 6. In some instances, the processing circuitry can be the control circuitry 410 of the electronic device 400 in FIG. 4, or the processors 510 of the computer apparatus 500 in FIG. 5.

Additionally, the operation 710 can include an operation where the processing circuitry is further configured to increment a counter associated with the local AS when the IP packet is forwarded to the local AS.

For example, at operation 710, the IP packet is forwarded to the local AS without encapsulation when the header field corresponds to the rule. The local AS can be a local network. Therefore, the forwarding at operation 710 can be performing by offloading the IP packet at the local network.

Moreover, the header field corresponds to the rule when the header field matches the rule associated with the local AS. For example, the header field includes an IP source address, an IP destination address, a port source address, a port destination address, and a protocol identity. The header field matches the role associated with the local AS when the IP source address, the IP destination address, the port source address, the port destination address, and the protocol identity of the header field match with the IP source address, the IP destination address, the port source address, the port destination address, and the protocol identity of the rule. In some instances, the header field matches the rule when one or more of the header fields (e.g., IP source address, an IP destination address, a non source address, a port destination address, and a protocol identity) match.

Alternatively, at operation 720, the GW-U 105, using processing circuitry, can discard the IP packet when the header field corresponds to another rule from the forwarding, policy associated with discarding the IP packet. For example, the forwarding policy can have a rule that an IP packet from a specific IP source address or to a specific IP destination is to be discarded. As previously discussed, the forwarding policy is received at operation 610 in FIG. 6, and the IP packet is received at operation 620 in FIG. 6. In some instances, the processing circuitry can be the control circuitry 410 of the electronic device 400 in FIG. 4, or the processors 510 of the computer apparatus 500 in FIG. 5.

Alternatively, at operation 750, the GW-U 105, using processing circuitry, can encapsulate and forward the IP packet to the PGW 120 when the header field docs not correspond to a rule from the forwarding policy In some instances, the determined user plane path is through an evolved packet core (EPC) when the IP packet is forwarded to the PGW. As previously discussed, the forwarding policy is received at operation 610 in FIG. 6, and the IP packet is received at operation 620 in FIG. 6. In some instances, the processing circuitry can be the control circuitry 410 of the electronic device 400 in FIG. 4, or the processors 510 of the computer apparatus 500 in FIG. 5.

Additionally, the operation 730 can include an operation where the processing circuitry is further configured processing circuitry is configured to refrain from incrementing a counter when the IP packet is Forwarded to the PGW.
Example UE As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
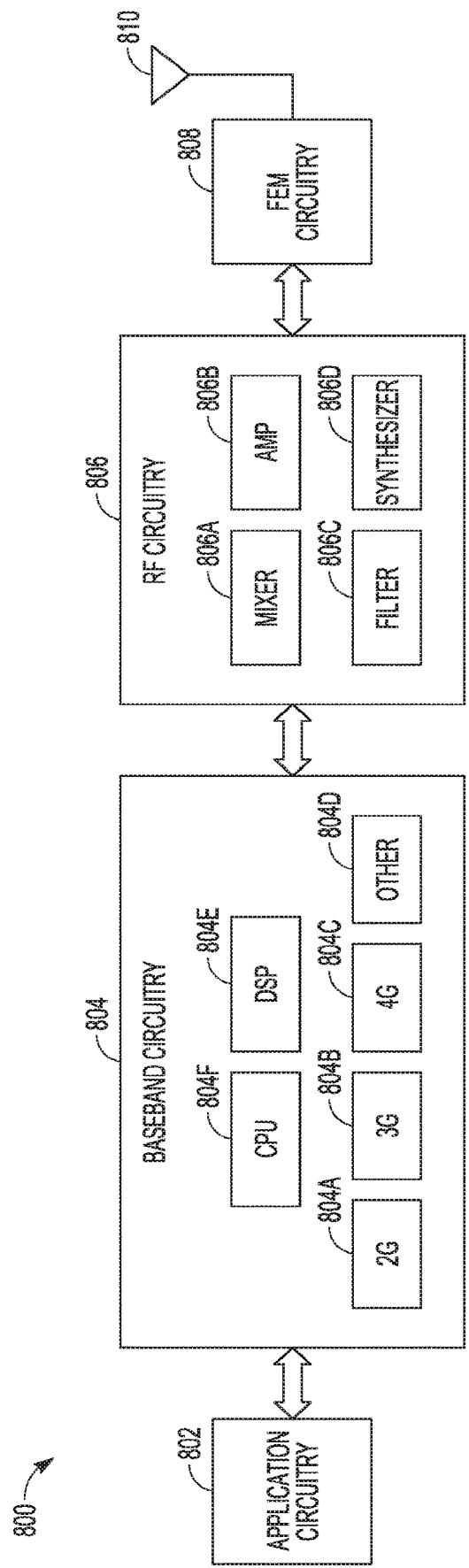
FIG. 8 illustrates example components of a UE, in accordance to some example embodiments.

Embodiments described herein may be implemented into a system using any suitably configured hardware and/or software. FIG. 8 illustrates, for one embodiment, example components of a User Equipment (UE) device or a gateway 800, such as a user-plane gateway (GW-U). In some instances, the gateway 800 can be the GW-C 125, the GW-U 105, the electronic device 400 or the computing apparatus 500. In some instances, the UE device in FIG. 8 can be UE 115. In some embodiments, the gateway 800 may include application circuitry 802, baseband circuitry 804. Radio Frequency (RF) circuitry 806, front-end module (FEM) circuitry 808 and one or more antennas 810, coupled together at least as shown.

The application circuitry 802 may include one or more application processors. For example the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuity 804 may interface with the application circuitry 802 for generation, and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processors) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via me RF circuitry 806. The radio control functions may include, but are not limited to, signal modulation/demodulation, encoding-decoding, radio frequency shifting, etc. In some embodiments, modulation/demodulation circuitry of the baseband circuitry 804 may include Fast-Fourier Transform (FFT), preceding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in oilier embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) dements A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806e and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d The amplifier circuitry 806b may be configured to amplify the down-converted signals and the fitter circuitry 806c may be a low-pass filter (LPF) or band-pass fiber (BPF) configured to remove unwanted signals from the down-converted signals to generate output baseband signals. Output baseband signals may be provided to the baseband circuitry 804 for Farther processing In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments the mixer circuitry 806a of the transmit signal path may be configured to up-convert input baseband signals based on the synthesized frequency provided by the synthesizer circuitry 806d to generate RF output signals for the MEM circuitry 808. The baseband signals may be provided by the baseband circuitry 804 and may be filtered by filter circuitry 806c. The filler circuitry 806c may include a low-pass filter (LPF), although the scope of the embodiments is not limited in this respect.

In some embodiments the mixer circuitry 806a of the receive signal path and the mixer circuitry 806a of the transmit signal path may include two or more mixers and may be arranged for quadrature downconversion and/or upconversion respectively. In some embodiments, the mixer circuitry 800a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for superheterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided far processing signals for each spectrum, although the scope of the embodiments is not limited in this respect.

In some embodiments, the synthesizer circuitry 806d may be a fractional-N synthesizer or a fractional N/N+1 synthesizer, although the scope oi the embodiments is not limited in this respect as other types of frequency synthesizers may be suitable. For example, synthesizer circuitry 806d may be a delta-sigma synthesizer, at frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some, embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a del ay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 1140, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the gateway 800 may include additional elements such as, for example, memory/storage, display, camera, sensor, and/or input/output (I/O) interface.

EXAMPLES

Example 1 is an apparatus of a user-plane gateway (GW-U), the apparatus comprising memory, and processing circuitry, configured to: decode a packet received from a control plane gateway (GW-C) in a packet data network gateway (PGW) over an Xc interface to determine a forwarding policy; and decode, from an evolved node B (eNB), an internet protocol (IP) packet the IP packet having a header field, determine a user-plane path for the IP packet based on a comparison of the header field and the forwarding policy, and encode the IP packet for transmission based on the determined user-plane path.

Wherein based on the determined user-plane path, the processing circuitry is configured to: forward the IP packet to a local application server (AS) when the header field corresponds to a rote from the forwarding policy that is associated with the local AS; or encapsulate and forward the IP packet to the PGW when the header field does not correspond to a rule from the forwarding policy.

Example 2 includes the apparatus of Example 1, wherein the IP packet is forwarded to the local AS without encapsulation when the header field corresponds to the rule.

Example 3 includes the apparatus of Example 1 or 2, wherein the IP packet is forwarded to the local AS by offloading the IP packer to a local network.

Example 4 includes the apparatus of Example 1-3, wherein the header field corresponds to the rule when the header field match the rule associated with the local AS.

Example 5 includes the apparatus of Example 1-4, wherein the header field includes an IP source address, an IP destination address, a port source address, a port destination address and a protocol identity, and wherein the IP source address, the IP destination address, the port source address, the port destination address, and the protocol identity match the rule associated with the local AS.

Example 6 includes the apparatus of Example 1-5, wherein the processing circuitry is further configured to: increment a counter associated with the local AS when the IP packet is forwarded to the local AS.

Example 7 includes the apparatus of Example 1-5, wherein the processing circuitry is further configured to refrain from incrementing a counter when the IP packet is forwarded to the PGW.

Example 8 includes the apparatus of Example 1-7, wherein the determined user plane path is through an evolved packet core (EPC) when the IP packet is forwarded to the PGW.

Example 9 includes the apparatus of Example 1-8, wherein the determined user-plane path further includes discarding the IP packet when the header field corresponds to another rule from the forwarding policy associated with discarding the IP packet.

Example 10 includes the apparatus of Example 1, wherein the IP packet is a domain name system (DNS) request received from a user equipment (UE).

Example 11 includes the apparatus of Example 10, wherein the processing circuitry is further configured to: transmit the DNS request to a global server load balancing (GSLB) system, the GSLB system having an address name (ANAME) record associated with an IP address of a local AS for the DNS request; receive a DNS response from the GSLB System, the DNS response having the IP address, and transmit the DNS response to the UE; and wherein the memory is further configured to store the IP address corresponding with the local AS.

Example 12 includes the apparatus of Example 1-11, wherein the forwarding policy is configured by an application server (AS) management and Orchestration (MANO) entity.

Example 13 is a nan-transitory computer readable storage medium that stores instructions for execution by one or more processors to perform operations for any of the Examples 1-12.

Example 14 is the GW-U of any of the Examples 1-12.

Example 15 is the network entity of any of Examples 1-12.

Example 16 may include any of the methods of communicating in a wireless network as shown and described herein.

Example 17 may include any of the systems tor providing wireless communication as show n and described herein.

Example 18 may include any of the devices for providing wireless communication as shown and described herein.

The foregoing description of one or more implementations provide illustration and description, but is not intended to be exhaustive or to limit the scope of the embodiments disclosed herein to the precise form disclosed. Modifications and variations are possible in light of the above teachings or may be acquired from practice of various implementations of the embodiments disclosed herein.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus of a user-plane entity of a core network, comprising:
   a non-transitory computer-readable memory medium; and
   one or more processors coupled to the memory medium, wherein the apparatus is configured to perform operations for selecting a user-plane path, the operations configured to:
      receive a forwarding policy including a set of rules and corresponding actions from a control-plane entity, wherein the set of rules includes the corresponding actions, wherein the corresponding actions include actions of whether a packet is to be forwarded or dropped;
      determine respective user-plane paths for first and second IP packets based on a comparison of respective header fields of the first and second IP packets and the set of rules of the forwarding policy, wherein based on the determined respective user-plane paths, the operations are further configured to:
         in a first case, forward the first IP packet to a local network without a general packet radio service (GPRS) tunneling protocol (GTP); and
         in a second case, GTP encapsulate and forward the second IP packet to a second user-plane entity of the core network; and
      forward the first and second IP packet packets for transmission based on the respective determined user-plane paths.

2. The apparatus of claim 1, wherein the first IP packet is forwarded to a local application server (AS) on the local network.

3. The apparatus of claim 1, wherein comparison to the set of rules includes a comparison of a tunnel endpoint identifier (TEID).

4. The apparatus of claim 1, wherein the respective header fields include an IP source address, an IP destination address, a port source address, a port destination address, and a protocol identity.

5. The apparatus of claim 1, wherein the forwarding policy further includes counter information for offline charging.

6. The apparatus of claim 1, wherein the operations are further configured to:
   in a third case, drop a third IP packet based on a comparison of a header field of the third IP packet and the set of rules of the forwarding policy.

7. The apparatus of claim 1, wherein portion of the forwarding policy causing forwarding to the local network is based on information from a provider of a third-party service.

8. The apparatus of claim 7, wherein the third-party service is an edge service.

9. A method for selecting a user-plane path, the method comprising:
   by a user-plane entity of a core network:
      receiving a forwarding policy including a set of rules and corresponding actions from a control-plane entity, wherein the set of rules includes the corresponding actions, wherein the corresponding actions include actions of whether a packet is to be forwarded or dropped;
      determining respective user-plane paths for first and second IP packets based on a comparison of respective header fields of the first and second IP packets and the set of rules of the forwarding policy, wherein based on the determined respective user-plane paths, method further comprises:
         in a first case, forwarding the first IP packet to a local network without a general packet radio service (GPRS) tunneling protocol (GTP); and
         in a second case, GTP encapsulating and forwarding the second IP packet to a second user-plane entity of the core network; and
      forwarding the first and second IP packet packets for transmission based on the respective determined user-plane paths.

10. The method of claim 9, wherein the first IP packet is forwarded to a local application server (AS) on the local network.

11. The method of claim 9, the method further comprising:
    in a third case, dropping a third IP packet based on a comparison of a header field of the third IP packet and the set of rules of the forwarding policy.

12. The method of claim 9, wherein portion of the forwarding policy causing forwarding to the local network is based on information from a provider of a third-party service, wherein the third-party service is an edge service.

13. An apparatus of a control-plane entity of core network comprising:
    non-transitory computer-readable memory medium;
    one or more processors coupled to the memory medium, wherein the apparatus is configured to perform operations for configuring selection of a user-plane path, the operations configured to:
       transmit, to a first user-plane entity, a forwarding policy including a set of rules and corresponding actions from the control-plane entity, wherein the set of rules includes the corresponding actions, wherein the corresponding actions include actions of whether a packet is to be forwarded or dropped, wherein the set of rules include fields for comparison to respective header fields of incoming packets at the first user pane entity, wherein the forwarding policy includes a configuration for user-plane path selection at the first user-plane entity, wherein a first rule of the set of rules corresponds to a first action of forwarding a first IP packet to a local network, wherein forwarding to the local network is performed without a general packet radio service (GPRS) tunneling protocol (GTP); and wherein a second rule of the set of rules corresponds to a second action of GTP encapsulation and forwarding the second IP packet to a second user-plane entity of the core network, wherein forwarding the second IP packet to the second user-plane entity includes GTP encapsulation.

14. The apparatus of claim 13,
wherein the first action includes forwarding to a local application server (AS) on the local network.

15. The apparatus of claim 13,
wherein comparison to the respective header fields of the incoming packets at the first user pane entity includes a comparison of a tunnel endpoint identifier (TEID).

16. The apparatus of claim 13,
wherein the respective header fields include an IP source address, an IP destination address, a port source address, a port destination address, and a protocol identity.

17. The apparatus of claim 13,
wherein the forwarding policy further includes counter information for offline charging.

18. The apparatus of claim 13,
wherein a third rule of the set of rules corresponds to a third action to drop a third IP packet.

19. The apparatus of claim 13,
wherein a portion of the forwarding policy causing forwarding to the local network is based on information from a provider of a third-party service.

20. The apparatus of claim 19, wherein the third-party service is an edge service.

\* \* \* \* \*